(12) United States Patent
Takashima et al.

(10) Patent No.: US 10,239,006 B2
(45) Date of Patent: Mar. 26, 2019

(54) POLYMER NANOFIBER STRUCTURAL BODY AND METHOD OF PRODUCING THE SAME

(71) Applicant: CANON KABUSHIKI KAISHA, Tokyo (JP)

(72) Inventors: Kenji Takashima, Tokyo (JP); Tetsuo Hino, Yamato (JP); Kazuhiro Yamauchi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 12 days.

(21) Appl. No.: 14/661,313

(22) Filed: Mar. 18, 2015

(65) Prior Publication Data
US 2015/0273377 A1 Oct. 1, 2015

(30) Foreign Application Priority Data
Mar. 26, 2014 (JP) ................. 2014-062927

(51) Int. Cl.
*B01D 53/02* (2006.01)
*B01D 46/00* (2006.01)
(Continued)

(52) U.S. Cl.
CPC ........ *B01D 46/0023* (2013.01); *B01D 29/56* (2013.01); *B29C 47/0014* (2013.01);
(Continued)

(58) Field of Classification Search
CPC ........ B01D 46/23; B01D 29/56; B29C 47/14; B32B 5/26; B03B 2262/238; B03B 2262/246
See application file for complete search history.

(56) References Cited

U.S. PATENT DOCUMENTS

2001/0037972 A1* 11/2001 Quick ................ B01D 39/2044
210/491
2004/0173506 A1* 9/2004 Doktycz ............ B01D 67/0072
210/85
(Continued)

FOREIGN PATENT DOCUMENTS

JP 2010-527414 A 8/2010
JP 2011-184815 A 9/2011
(Continued)

OTHER PUBLICATIONS

Takashima et al., U.S. Appl. No. 14/662,892, filed Mar. 19, 2015.
(Continued)

*Primary Examiner* — Christopher P Jones
(74) *Attorney, Agent, or Firm* — Venable LLP

(57) ABSTRACT

A polymer nanofiber structural body of the present invention is a polymer nanofiber structural body in which polymer nanofibers are integrated, including a first layer and a second layer different from each other in polymer nanofiber existence ratio, in which: both the first layer and the second layer are laminated through a buffer region; the buffer region includes a region in direct contact with both the first layer and the second layer; and a polymer nanofiber existence ratio of the region continuously changes from a polymer nanofiber existence ratio of the first layer to a polymer nanofiber existence ratio of the second layer in a direction from the first layer to the second layer.

7 Claims, 2 Drawing Sheets

(51) Int. Cl.
    *B01D 29/56*   (2006.01)
    *B29C 47/00*   (2006.01)
    *B32B 5/26*    (2006.01)

(52) U.S. Cl.
    CPC .......... *B32B 5/26* (2013.01); *B32B 2262/023* (2013.01); *B32B 2262/0238* (2013.01); *B32B 2262/0246* (2013.01)

(56) References Cited

U.S. PATENT DOCUMENTS

| | | | |
|---|---|---|---|
| 2006/0137318 A1* | 6/2006 | Lim .................... | B01D 39/1615 55/528 |
| 2008/0149561 A1* | 6/2008 | Chu ..................... | A61L 15/425 210/500.38 |
| 2009/0074832 A1* | 3/2009 | Zussman ............. | A61L 27/3821 424/423 |
| 2013/0092622 A1* | 4/2013 | Kas ..................... | B01D 69/12 210/489 |
| 2013/0256230 A1* | 10/2013 | Dullaert ............... | B01D 65/08 210/650 |
| 2015/0218324 A1 | 8/2015 | Hino et al. | |
| 2015/0273366 A1 | 10/2015 | Takashima et al. | |
| 2015/0273812 A1 | 10/2015 | Takashima et al. | |
| 2016/0069005 A1 | 3/2016 | Takashima et al. | |
| 2016/0108192 A1 | 4/2016 | Yasufuku et al. | |

FOREIGN PATENT DOCUMENTS

| | | |
|---|---|---|
| JP | 2012-219384 A | 11/2012 |
| JP | 2012-223254 A | 11/2012 |
| JP | 2014-005557 A | 1/2014 |
| WO | 2008/108392 A1 | 9/2008 |
| WO | 2008/142023 A2 | 11/2008 |
| WO | 2013/112793 WO | 8/2013 |

OTHER PUBLICATIONS

Takashima et al., U.S. Appl. No. 14/662,500, filed Mar. 19, 2015.
Hino et al., U.S. Appl. No. 14/603,782, filed Jan. 23, 2015.
Notification of Reasons for Refusal in Japanese Application No. 2014-062927 (dated Jan. 23, 2018).
English Language Translation of Notification of Reasons for Refusal in Japanese Application No. 2014-062927 (dated Sep. 4, 2018).

* cited by examiner

POLYMER NANOFIBER STRUCTURAL BODY AND METHOD OF PRODUCING THE SAME

BACKGROUND OF THE INVENTION

Field of the Invention

The present invention relates to a polymer nanofiber structural body and a method of producing the structural body.

Description of the Related Art

Industrial utilization of fine particles has become active. In the meantime, an apparatus for collecting fine particles scattered in air or dispersed in a liquid has been needed. In recent years, a polymer nanofiber structural body in which polymer nanofibers are integrated and three-dimensionally intertwined with each other typified by a polymer nanofiber sheet has been attracting attention as a material for the collection.

Unlike general fibers to be used in a nonwoven fabric and the like, each of the polymer nanofibers has a diameter of several microns or less. Accordingly, the polymer nanofiber structural body is drastically superior to a structural body including the general fibers because of the following reason. Even when the polymer nanofibers are integrated, an enormous specific surface area, a nanosize continuous pore structure, and a low density are obtained. By virtue of those properties, new functions such as a mechanical strength, reactivity, electrical and optical characteristics, and the permeability of the inside of the structural body can be imparted. In particular, when the pore structure is utilized, a pore diameter of the order of submicrons is obtained and hence the pore structure is suitable for the collection of fine particles. Further, each of the polymer nanofibers uses an organic compound as a parent material and hence is lightweight. In addition, the polymer nanofibers can be produced with ease and at a low cost.

Meanwhile, in order to selectively collect fine particles having different sizes, it has been necessary that the polymer nanofiber structural body have a plurality of pore structures therein. In each of Japanese Patent Application Laid-Open No. 2012-223254 and Japanese Patent Application Laid-Open No. 2012-219384, an attempt has been made to bond a plurality of fiber layers to provide a polymer nanofiber structural body with a plurality of pore structures.

SUMMARY OF THE INVENTION

That is, according to one embodiment of the present invention, there is provided a polymer nanofiber structural body in which polymer nanofibers are integrated, including a first layer and a second layer different from each other in polymer nanofiber existence ratio, in which: the first layer and the second layer are laminated through a buffer region; and the buffer region includes a region in direct contact with the first layer and the second layer, a polymer nanofiber existence ratio of the region continuously changing from a polymer nanofiber existence ratio of the first layer to a polymer nanofiber existence ratio of the second layer in a direction from the first layer to the second layer.

In addition, according to another embodiment of the present invention, there is provided a polymer nanofiber structural body in which polymer nanofibers are integrated, including a first layer and a second layer different from each other in average pore diameter, in which: the first layer and the second layer are laminated through a buffer region; and the buffer region includes a region in direct contact with the first layer and the second layer, an average pore diameter of the region continuously changing from an average pore diameter of the first layer to an average pore diameter of the second layer in a direction from the first layer to the second layer.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

When the method of Japanese Patent Application Laid-Open No. 2012-223254 is employed, the structural body may peel at an interface where the structural body is bonded in the case where the structural body is used in a bent state like the case where the structural body is bonded to a curved surface. Meanwhile, in Japanese Patent Application Laid-Open No. 2012-219384, an attempt has been made to mix nanobeads to improve interfacial adhesiveness upon bonding of the plurality of fiber layers. However, when the method of Japanese Patent Application Laid-Open No. 2012-219384 is employed, the clogging of the pore structures with the nanobeads occurs and hence a desired pore structure is not obtained in some cases.

In view of the foregoing, an object of the present invention is to provide a durable polymer nanofiber structural body that does not peel without bonding a plurality of nanofiber layers.

The present invention is hereinafter described in detail by way of an embodiment of the present invention. It should be noted that a known or well-known technology in the art is applied to a portion not particularly illustrated or described in the specification.

(Polymer Nanofiber Structural Body)

Now, a polymer nanofiber structural body of the present invention is described with reference to the drawings.

Figure 1:
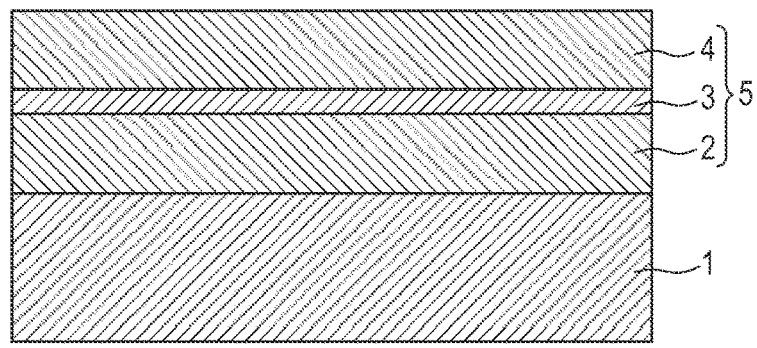
FIG. 1 is a schematic sectional view illustrating an example of a polymer nanofiber structural body-containing member of the present invention.

FIG. 1 is a schematic sectional view illustrating an example of a polymer nanofiber structural body-containing member including the polymer nanofiber structural body of the present invention on a base material. In FIG. 1, the base material is represented by reference numeral 1, a first layer is represented by reference numeral 2, a buffer region is represented by reference numeral 3, a second layer is represented by reference numeral 4, and the polymer nanofiber structural body is represented by reference numeral 5.

The polymer nanofiber structural body 5 of the present invention has a structure in which polymer nanofibers are integrated and three-dimensionally intertwined with each other. In addition, the portion of the polymer nanofiber structural body 5 except the portion in which the nanofibers are integrated is air in the atmosphere.

In the polymer nanofiber structural body 5 according to a first embodiment of the present invention, the first layer 2 and the second layer 4 are different from each other in polymer nanofiber existence ratio. In addition, the first layer 2 and the second layer 4 are laminated through the buffer region 3. The buffer region 3 is a region in direct contact with the first layer 2 and the second layer 4, a polymer nanofiber existence ratio of the region continuously changing from the polymer nanofiber existence ratio of the first layer 2 to the polymer nanofiber existence ratio of the second layer 4 in a direction from the first layer 2 to the second layer 4.

In addition, in the polymer nanofiber structural body 5 according to a second embodiment of the present invention, the first layer 2 and the second layer 4 are different from each other in average pore diameter. In addition, the first layer 2 and the second layer 4 are laminated through the buffer region 3. The buffer region 3 is a region in direct contact with the first layer 2 and the second layer 4, an average pore diameter of the region continuously changing from the average pore diameter of the first layer 2 to the average pore diameter of the second layer 4 in the direction from the first layer 2 to the second layer 4.

The polymer nanofiber structural body of the present invention only needs to be such that at least two kinds of layers different from each other in polymer nanofiber existence ratio or average pore diameter are laminated through a buffer region, and is not limited to that illustrated in FIG. 1. Three or more kinds of layers having different polymer nanofiber existence ratios or different average pore diameters may be laminated through buffer regions, and for example, a third layer different from the second layer 4 in polymer nanofiber existence ratio or average pore diameter may be laminated on the second layer 4 through a buffer region.

The term "polymer nanofiber existence ratio" as used in the present invention refers to the ratio of a spatial area occupied by polymer nanofibers per unit area. The polymer nanofiber existence ratio is a value including information about a polymer nanofiber diameter, the size of a portion (void portion) in which no polymer nanofiber is present, and the ratio (void ratio) of the portion in which no polymer nanofiber is present.

The polymer nanofiber existence ratio is preferably from 1% or more to less than 95%. When the ratio becomes less than 1%, the amount of the polymer nanofibers acting as a substance-collecting material reduces and hence there is a risk in that a collecting effect on a substance of a submicron size reduces. On the other hand, when the ratio becomes 95% or more, there is a risk in that the following problem occurs: a substance hardly passes the pore portions of the nanofibers or the collection of a slight amount of the substance results in the clogging of the pores.

The polymer nanofiber existence ratio can be calculated as described below. That is, a section of the polymer nanofiber structural body is subjected to measurement with a scanning electron microscope (SEM) or a laser microscope, and the resultant image is captured in image analysis software. After that, the image is binarized to be cut and divided into a polymer nanofiber existing portion and a polymer nanofiber non-existing portion. Then, the area ratio of the portion corresponding to the polymer nanofiber existing portion is calculated. Thus, the ratio can be calculated.

The term "average pore diameter" as used in the present invention refers to the average of partial pore diameters in a specific space. Here, the term "pore" as used in the present invention refers to a gap space produced by a plurality of adjacent polymer nanofibers when the nanofibers are not in contact with each other. In addition, the term "partial pore diameter" as used in the present invention refers to the length of the smallest portion in an unspecified pore. When the plurality of polymer nanofibers are in close contact with each other and hence even a slight gap is not produced, the gap space is not referred to as "pore" and hence the partial pore diameter takes a value larger than zero.

The partial pore diameter may take any value ranging from a small value to a large value irrespective of the states of the fiber diameters of the polymer nanofibers. However, the average pore diameter tends to be relatively small when the fiber diameters of the polymer nanofibers are small, and tends to be relatively large when the fiber diameters are large. The tendency becomes particularly significant as the polymer nanofiber existence ratio in a space increases.

The average pore diameter is preferably from 10 nm or more to less than 50,000 nm. In particular, the average pore diameter is preferably less than 10,000 nm when the structural body is used as a material for collecting a substance of a submicron size. When the average pore diameter is less than 10 nm, there is a risk in that the pores of a layer are clogged by a capillary phenomenon upon adhesion of moisture in a gas as a droplet. On the other hand, when the average pore diameter is 50,000 nm or more, the space of the layer is so large as compared to the diameters of the polymer nanofibers that there is a risk in that its strength reduces.

The average pore diameter of the entirety of the polymer nanofiber structural body can be measured with a pore diameter distribution-evaluating apparatus employing a bubble point method or a BET method. In addition, the average pore diameter in a local range of the polymer nanofiber structural body can be calculated as described below. That is, a section of the polymer nanofiber structural body is subjected to measurement with a scanning electron microscope (SEM) or a laser microscope, and the resultant image is captured in image analysis software. Then, the shortest length (partial pore diameter) in each gap between the polymer nanofibers is measured for 50 arbitrary points and the average of the measured values is calculated. Thus, the average pore diameter can be determined.

A magnitude relation between the polymer nanofiber existence ratios or average pore diameters of the first layer 2 and the second layer 4 may be "first layer 2>second layer 4" or may be "first layer 2<second layer 4." Further, when the structural body has three or more kinds of layers having different polymer nanofiber existence ratios or different average pore diameters, a magnitude relationship among the polymer nanofiber existence ratios or average pore diameters of the respective layers is not particularly limited. For example, when the structural body has three kinds of layers, any one of the following relationships is permitted.

First layer 2>second layer 4>third layer
First layer 2<second layer 4<third layer
First layer 2>second layer 4<third layer and first layer 2≠third layer
First layer 2>second layer 4<third layer and first layer 2=third layer
First layer 2<second layer 4>third layer and first layer 2≠third layer
First layer 2<second layer 4>third layer and first layer 2=third layer The buffer region 3 is a region in direct contact with the first layer 2 and the second layer 4. In addition, the buffer region 3 is a region whose polymer nanofiber existence ratio continuously changes from the polymer nanofiber existence ratio of the first layer 2 to the polymer nanofiber existence ratio of the second layer 4 in the direction from the first layer 2 to the second layer 4. Alternatively, the buffer region 3 is a region whose average pore diameter continuously changes from the average pore diameter of the first layer 2 to the average pore diameter of the second layer 4. Here, the phrase "continuously changes" means that the polymer nanofiber existence ratio or the average pore diameter changes without the presence of any interface at which the polymer nanofiber existence ratio or the average pore diameter drastically or discontinuously changes.

The continuous change of the polymer nanofiber existence ratio or average pore diameter in the buffer region 3 can be confirmed by: subjecting a section of the polymer nanofiber structural body to measurement with a scanning electron microscope (SEM) or a laser microscope; and observing the absence of any interface.

In the polymer nanofiber structural body 5 of the present invention, no interfaces are present between the first layer 2 and the second layer 4, specifically between the first layer 2 and the buffer region 3, in the buffer region 3, and between the buffer region 3 and the second layer 4. Accordingly, it is preferred that the first layer 2 and the buffer region 3 be continuously formed, and the buffer region 3 and the second layer 4 be continuously formed. When individual polymer nanofiber structural bodies different from each other in polymer nanofiber existence ratio or average pore diameter are merely bonded to each other, an interface at which the integration state of the polymer nanofibers drastically changes is clearly present. Accordingly, when a stress is applied to the polymer nanofiber structural bodies, peeling may occur from the vicinity of the interface. However, in the polymer nanofiber structural body 5 of the present invention, the polymer nanofibers are continuously integrated without the presence of any interface, and hence the following effect is obtained: the structural body does not peel even when a stress is applied. When the polymer nanofiber structural body is placed on a curved surface, portions to be compressed and stretched occur in a portion close to the curved surface and a portion distant therefrom, and hence the structure produced by the polymer nanofibers changes. The polymer nanofiber structural body of the present invention considers the change in advance, and hence the structural body does not peel and can maintain a desired structure irrespective of its form of use.

In the polymer nanofiber structural body, the form of the integration of the polymer nanofibers may be random or may be such an oriented state that the number of polymer nanofibers whose length directions are directed toward a specific direction is large.

A material serving as the base material 1 is by no means limited, and an organic material typified by a resin material, an inorganic material such as silica or titania, or a material obtained by hybridizing the organic material and the inorganic material may be used. In addition, the material may change in the middle of the base material 1, and the base material may have a hollow structure or a porous structure.

Examples of the organic material include the same examples as those of a polymer material to be used as a polymer nanofiber material to be described later.

Examples of the inorganic material include simple substances and compounds of Si, Mg, Al, Ti, Zr, V, Cr, Mn, Fe, Co, Ni, Cu, Sn, and Zn. Examples thereof may include quartz glass, quartz, silica ($SiO_2$), sapphire, aluminum oxide, titanium oxide, zirconium oxide, iron oxide, chromium oxide, zinc oxide, gallium nitride, gallium arsenide, silicon carbide (SiC), gallium phosphide, silicon, aluminum phosphide, aluminum arsenide, zinc telluride, zinc selenide, graphite, and borosilicate glass. In addition, a clay mineral such as montmorillonite (MN) may be used.

(Polymer Nanofiber)

The polymer nanofibers of the present invention contain at least one kind of polymer, and the length of each of the polymer nanofibers is longer than its thickness. It should be noted that the term "nanofiber" as used herein refers to a polymer nanofiber formed of a polymer component unless otherwise stated.

In the present invention, the average diameter (average fiber diameter) of the polymer nanofibers serving as an indicator of their thicknesses, which is not particularly limited, is preferably from 1 nm or more to less than 10,000 nm. In particular, in order to obtain a polymer nanofiber structural body having a high specific surface area, the average diameter is more preferably less than 1,500 nm because the number of fibers per space is limited when the fiber diameters are excessively large. It should be noted that when the average diameter of the polymer nanofibers is less than 1 nm, the polymer nanofibers themselves are difficult to handle from the viewpoint of the production of the polymer nanofiber structural body. On the other hand, the average diameter is preferably 50 nm or more from the viewpoint of the ease of handling of the polymer nanofibers because the polymer nanofibers tend to be easy to handle.

In the present invention, the sectional shapes of the polymer nanofibers are not particularly limited, and specific examples of the shapes include a circular shape, an elliptical shape, a quadrangular shape, a polygonal shape, and a semicircular shape. It should be noted that the sectional shapes of the polymer nanofibers may not be such accurate shapes as listed above, and each of the polymer nanofibers may have different shapes at arbitrary sections. Here, when it is hypothesized that the polymer nanofibers have shapes of columns, the diameters of circles serving as the sections of the columns correspond to the thicknesses of the polymer nanofibers. In addition, when the polymer nanofibers do not have shapes of columns, the thicknesses of the polymer nanofibers refer to the lengths of the longest straight lines passing centers of gravity in the sections of the polymer nanofibers. It should be noted that in the present invention, the length of each of the polymer nanofibers is typically 10 or more times as long as its thickness.

The shapes of the polymer nanofibers (such as the sectional shapes of the fibers and the fiber diameters) can be confirmed by direct observation based on measurement with a scanning electron microscope (SEM) or laser microscope. Specifically, the average fiber diameter of the polymer nanofibers can be calculated as described below. That is, the average fiber diameter can be determined by: subjecting a section of the polymer nanofiber structural body to measurement with a scanning electron microscope (SEM) or a laser microscope; capturing the resultant image in image analysis software; and then measuring the widths of the polymer nanofibers at 50 arbitrary points.

In the present invention, the polymer nanofibers are not particularly limited as long as the polymer nanofibers are each formed of at least an organic polymer component. A conventionally known polymer material can be used as the organic polymer, and one kind of such materials may be used alone, or two or more kinds thereof may be used in combination. In addition, a material containing a fine particle or a conventionally known filler can be used as the organic polymer, and the polymer can be formed by appropriately combining such materials.

A polymer material serving as each of the polymer nanofibers constituting the polymer nanofiber structural body of the present invention is not particularly limited as long as the material can form a polymer nanofiber structural body. Specific examples thereof include: an organic material typified by a resin material; and a hybrid material of the organic material and an inorganic material such as silica, titania, or a clay mineral. In addition, the material may change in the middle of the fibers.

Here, examples of the polymer material may include: a fluorine-containing polymer (such as tetrafluoroethylene or polyvinylidene fluoride (PVDF); the fluorine-containing polymer may include a copolymer of a fluorine-containing polymer and any other monomer (such as a copolymer of PVDF and hexafluoropropylene (PVDF-HFP))); a polyolefin-based polymer (such as polyethylene or polypropylene); polystyrene (PS); a polyarylene (aromatic polymer such as polyparaphenylene oxide, poly(2,6-dimethylphenylene oxide), or polyparaphenylene sulfide); polyimide; polyamide; polyamide imide; polybenzimidazole; a modified polymer obtained by introducing a sulfonic group ($-SO_3H$), a carboxy group ($-COOH$), a phosphoric group, a sulfonium group, an ammonium group, or a pyridinium group into a polyolefin-based polymer, polystyrene, polyimide, or a polyarylene (aromatic polymer); a modified polymer obtained by introducing a sulfonic group, a carboxy group, a phosphoric group, a sulfonium group, an ammonium group, or a pyridinium group into a skeleton of a fluorine-containing polymer; a polybutadiene-based compound; a polyurethane-based compound (including an elastomer-like compound or a gel-like compound); a silicone-based compound; polyvinyl chloride; polyethylene terephthalate; nylon; polyarylate and a biodegradable polymer (such as polycaprolactone (PCL) or polylactic acid); a polyether (such as polyethylene oxide (PEO) or polybutylene oxide); and a polyester (PES) (such as polyethylene terephthalate (PET)).

It should be noted that one kind of the polymer materials listed above may be used alone, or two or more kinds thereof may be used in combination. In addition, in the polymer material other than the polyolefin-based polymer, polystyrene, polyimide, the polyarylene, and the fluorine-containing polymer, there may be used a modified polymer obtained by introducing a sulfonic group, a carboxy group, a phosphoric group, a sulfonium group, an ammonium group, or a pyridinium group. Further, a copolymer obtained by copolymerizing a plurality of kinds of monomers may be used. In addition, in the case of a polymer material that is hardly caused to melt such as polyimide, polyamide, polyamide imide (PAI), or polybenzimidazole (PBI), the polymer material may be used in combination with, for example, a thermoplastic resin.

Examples of the inorganic material may include oxides of metal materials selected from Si, Mg, Al, Ti, Zr, V, Cr, Mn, Fe, Co, Ni, Cu, Sn, and Zn. More specific examples of the inorganic material may include metal oxides such as silica ($SiO_2$), titanium oxide, aluminum oxide, alumina sol, zirconium oxide, iron oxide, and chromium oxide. In addition, a clay mineral such as montmorillonite (MN) may be used. Here, the inorganic material is preferably incorporated into each of the polymer nanofibers from the viewpoint of an improvement in durability as long as a pore image in a desired state can be obtained because a mechanical strength tends to increase significantly upon joining of the polymer nanofibers.

In addition, the case where the repeating structure constituting each polymer nanofiber includes an imide structure is preferred because heat resistance and a mechanical strength tend to be high by virtue of its rigid and strong molecular structure. Accordingly, a polymer nanofiber structural body that hardly deforms and has a high specific surface area tends to be obtained. Thus, the mechanical strength of the polymer nanofiber structural body significantly improves, which is preferred from the viewpoint of an improvement in its durability.

It should be noted that when a different compound is incorporated so as to be caused to chemically act on the polymer nanofibers, the temperature at which the compound acts is preferably equal to or less than the decomposition temperature of the polymer material.

(Method of Producing Polymer Nanofiber Structural Body)

Next, a method of producing a polymer nanofiber structural body of the present invention is specifically described.

The production method of the present invention includes: a first step of forming the first layer 2 under a first production condition; and a second step of forming the second layer 4 under a second production condition different from the first production condition. In addition, the method includes, between the first step and the second step, a buffer region-forming step of forming the buffer region 3 while continuously changing a production condition from the first production condition to the second production condition. In the production method of the present invention, it is preferred that the buffer region-forming step be continuously performed after the first step and the second step be continuously performed after the buffer region-forming step.

The first step, the second step, and the buffer region-forming step are each a step of forming polymer nanofibers constituting the polymer nanofiber structural body. Here, a method of forming the polymer nanofibers, which is not particularly limited, is, for example, an electrospinning method or a melt blow method. It should be noted that in the present invention, only one kind of those methods may be selected and employed, or two or more kinds thereof may be selected and employed in combination. It should be noted that of the methods listed above, the electrospinning method is a method involving forming the polymer nanofibers in a state in which a high voltage is applied between a polymer solution in a syringe and a collector electrode. When the method is adopted, the solution extruded from the syringe is provided with charge to scatter in an electric field. However, as the time lapses, a solvent in the scattered solution evaporates. As a result, a thinned solute appears. The thinned solute serves as a polymer nanofiber to adhere to a collector.

Of the methods listed above, the first step, the second step, and the buffer region-forming step are each preferably a step of performing spinning by the electrospinning method having the following advantages (i) to (iii):
(i) various polymers can be spun into fiber shapes;
(ii) the control of a fiber shape is relatively easy and a fiber having a thickness of from several nanometers to several tens of micrometers can be easily obtained; and
(iii) a production process is easy.

Figure 2:
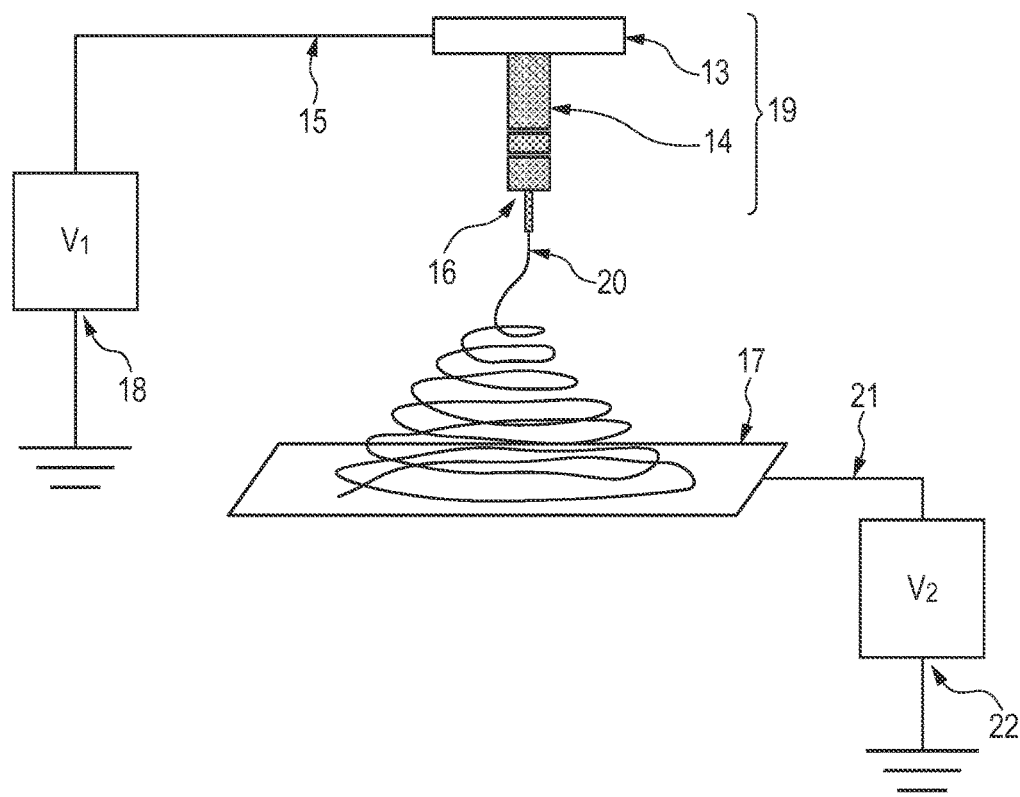
FIG. 2 is a schematic view illustrating an example of an apparatus for producing a polymer nanofiber structural body of the present invention.

Here, the step based on the spinning of the polymer nanofibers by the electrospinning method is described with reference to the drawing. FIG. 2 is a schematic view illustrating an example of a production apparatus for the polymer nanofiber structural body of the present invention.

The production apparatus illustrated in FIG. 2 specifically adopts a method involving extruding a polymer solution stored in a storage tank 14 from a spinning nozzle 16. It should be noted that the polymer solution extruded from the spinning nozzle 16 scatters in all directions and hence a polymer nanofiber structural body in which spun polymer nanofibers are three-dimensionally intertwined with each other is naturally produced. Thus, the spun polymer nanofibers do not need to be twisted in a later step.

Next, the constituent members of the production apparatus of FIG. 2 are described. The storage tank 14 for storing the polymer solution is arranged through a connecting portion 13. It should be noted that the connecting portion 13 is electrically connected to an upper power source 18 whose voltage can be freely changed from a minus high voltage to a plus high voltage through a wiring 15. In addition, the connecting portion 13 and the storage tank 14 are each a constituent member of a head 19. A collector 17 in which the spun polymer nanofibers are collected is arranged so as to face the head 19 with a certain interval therebetween. It should be noted that the collector 17 is connected to a lower power source 22 whose voltage can be freely changed from a minus high voltage to a plus high voltage (directly connected to the ground in the case of a zero potential) through a wiring 21. Here, the polymer solution set to a condition under which the solution is turned into nanofibers is introduced into the storage tank 14 and spun. It should be noted that a material to be stored in the storage tank 14 at the time of the spinning is not limited to the polymer solution and a molten polymer heated to its melting point or more may be utilized.

The polymer solution is extruded from the storage tank 14 to the spinning nozzle 16 at a constant speed. A voltage of from −50 to 50 kV is applied from the upper power source 18 to the spinning nozzle 16. Meanwhile, a voltage of from −50 to 50 kV is applied from the lower power source 22 to the collector portion 17, or the power source is turned off and the collector is connected to the ground. When electrical attraction exceeds the surface tension of the polymer solution, a jet 20 of the polymer solution is jetted toward the collector 17. At this time, a solvent in the jet 20 gradually volatilizes, and upon arrival of the jet at the collector 17, the corresponding polymer nanofibers are obtained. In this regard, however, it is not necessary that the solvent completely volatilize to be removed at the time of the arrival of the polymer nanofibers at the collector 17. It should be noted that when the polymer nanofiber structural body is produced on the desired base material 1, the base material 1 is placed on the collector 17.

In the spinning by the electrospinning method, structures such as the fiber diameters of the polymer nanofibers, and the polymer nanofiber existence ratio, average pore diameter, and void ratio of the polymer nanofiber structural body are determined by production conditions. Examples of the production conditions include the kind of a polymer, an additive mixed in the polymer and its ratio, the viscosity of the polymer solution, a temperature and humidity at the time of the production, and spinning conditions. Here, examples of the spinning conditions include the speed at which the polymer solution is extruded from the storage tank 14 to the spinning nozzle 16, the voltage value of the upper power source 18, and the voltage value of the lower power source 22.

Of those production conditions, the first production condition, the second production condition, and the production condition to be continuously changed are each preferably at least one of a voltage on a spinning nozzle side (the voltage of the upper power source 18), a voltage on a collector side (the voltage of the lower power source 22), and a potential difference between the spinning nozzle and the collector.

For example, when the first production condition, the second production condition, and the production condition to be continuously changed are each the voltage on the spinning nozzle 16 side, in the first step, the first layer 2 is formed by performing the spinning while fixing the voltage of the upper power source 18 to a first upper voltage and the voltage of the lower power source 22 to a first lower voltage. Next, during the spinning of the first layer 2, the spinning is continued while the voltage of the upper power source 18 is continuously changed from the first upper voltage to the set voltage of the upper power source 18 in the second step (second upper voltage) with the voltage of the lower power source 22 fixed to the first lower voltage. Thus, the buffer region 3 is formed (buffer region-forming step). Next, when the voltage of the upper power source 18 reaches the second upper voltage, the second layer 4 is formed by performing the spinning while fixing the voltage of the upper power source 18 to the second upper voltage and the voltage of the lower power source 22 to the first lower voltage (second step). In the buffer region-forming step, the polymer nanofiber existence ratio or the average pore diameter is continuously changed. In addition, the first step and the buffer region-forming step are continuous with each other, and the buffer region-forming step and the second step are also continuous with each other. Accordingly, the spinning is not stopped between such steps, and hence no interfaces are formed between the first layer 2 and the buffer region 3, and between the buffer region 3 and the second layer 4.

Here, means for increasing the polymer nanofiber existence ratio and reducing the average pore diameter is a method involving applying a minus high voltage from the lower power source 22 in the case where the voltage value of the upper power source 18 is positive. A mechanism for the foregoing has not been elucidated but the following hypothesis has been formed. In a production mechanism for the polymer nanofiber structural body, a portion except a portion to which a voltage is applied can be regarded as being connected to the ground, in other words, its voltage value can be regarded as zero. Accordingly, when the polymer nanofiber structural body is produced with the voltage of the upper power source 18 set to a positive value, the polymer nanofibers are integrated on the collector 17, and at the same time, the possibility that the polymer nanofibers scatter toward the surroundings increases. When a minus high voltage below zero is applied from the lower power source 22, large electrical attraction acts in a direction toward the collector 17 whose voltage is locally lower than that of the surroundings, and hence the amount of the polymer nanofibers to be integrated increases. Further, the following hypothesis has been formed. When a minus high voltage is applied to the charge that has been positively charged at the time of the spinning, electrical repulsion between a polymer nanofiber that has already been spun and a polymer nanofiber to be spun next reduces, and hence the polymer nanofibers can be densely integrated.

As long as the polymer nanofiber structural body has a desired structure, the following treatment may be performed after the integration of the polymer nanofibers as required: another substance is added to the surface or inside of each polymer nanofiber, or a chemical reaction is induced. Examples of a method for the treatment include a method involving performing heat treatment, a method involving bringing a compound into contact with the polymer nanofiber based on a wet or dry process, and a method involving performing both of the foregoing. It should be noted that an operation after the integration of the polymer nanofibers is preferably performed at a temperature equal to or less than the melting point of each of the polymer nanofibers.

When the polymer nanofiber structural body includes the base material 1, the polymer nanofibers may be integrated on the collector 17 before being transferred onto the desired base material 1, or the polymer nanofibers may be integrated on the desired base material 1 in advance.

The present invention is hereinafter described by way of Examples. However, the present invention is not limited to Examples. It should be noted that production conditions and results of evaluations are collectively shown in TABLE 1.

(Measurement Method and Evaluation Method)

(1) Structural Evaluation of Polymer Nanofiber Structural Body

A polymer nanofiber structural body was cut into two equal parts with an argon beam. The used apparatus was a Cross-section Polishing manufactured by JEOL Ltd., and the treatment was performed at an applied voltage of 4 kV for a time period of 5 hours. A fracture surface of one of the two equal parts obtained by the cutting was observed by utilizing a SEM. The used apparatus was S-4800 manufactured by Hitachi High-Technologies Corporation, and its acceleration voltage was 3 kV.

(a) Integration State of Polymer Nanofibers

Whether an interface was present (whether polymer nanofibers were continuously integrated) on the entirety of the fracture surface was observed.

(b) Calculation of Polymer Nanofiber Existence Ratio and Average Pore Diameter

SEM images of a square 20 μm on a side inside a portion distant from the surface (first surface) of the first layer 2 by 5 μm, and a square 20 μm on a side inside a portion distant from the surface (second surface) of the second layer 4 by 5 μm, in the fracture surface were photographed. The photographing was performed at 10 points in a direction parallel to the surfaces. Each SEM image was subjected to binarization treatment with image software "Image J". Thus, the image was cut and divided into a polymer nanofiber portion and a void portion.

A polymer nanofiber existence ratio was calculated from the average of the area ratios of the polymer nanofibers at the 10 respective points. In addition, 50 arbitrary pore portions each formed of a gap between a plurality of polymer nanofibers were sampled, the length (partial pore diameter) of the shortest portion of each pore was measured, and an average pore diameter was calculated from the average of all measured values. In addition, 50 arbitrary points were sampled and the width of a polymer nanofiber at each point was measured. Thus, the average fiber diameter of the polymer nanofibers was determined.

(2) Peeling Resistance Test of Polymer Nanofiber Structural Body

An improvement in peeling resistance of the polymer nanofiber structural body was confirmed by a bending test. Specifically, a bending angle in a state in which the polymer nanofiber structural body was not bent was defined as 0°. Then, the polymer nanofiber structural body was bent along an arbitrary axis. At this time, the structural body was cut with a knife so that a fracture surface of the axis portion could be viewed. The structural body was bent along the axis until the bending angle became 60°. After that, the bending angle was returned to 0° and the structural body was bent toward the opposite side until the bending angle became 60°. After that, the bending angle was returned to 0°. The series of operations was defined as one set and the set was repeated 20 times. After that, a SEM image of the fracture surface was observed, and the case where no peeling occurred was determined as being good and the case where peeling occurred was determined as being bad.

Example 1

A polymer nanofiber structural body-containing member illustrated in FIG. 1 was produced with an apparatus of an electrospinning system illustrated in FIG. 2.

The used apparatus is NANON manufactured by MECC CO., LTD. A syringe with a metallic needle was used as the storage tank 14 for a polymer solution. An aluminum plate was used as the collector 17. A distance from the head 19 in which the metallic needle portion was placed to the collector 17 was a constant value of 30 cm. An aluminum foil as the base material 1 was placed on the collector 17.

(Preparation of Polymer Solution)

The polymer solution was prepared by dissolving polyamide imide (PAI, VYLOMAX HR-13NX) in dimethylformamide (DMF) so that a solid content concentration became 25 wt %.

(Production of Polymer Nanofiber Structural Body)

The resultant polymer solution was flowed into the storage tank 14, the storage tank 14 was attached to the electrospinning apparatus, and the settings of the apparatus were adjusted so that the speed at which the solution was extruded became 1 ml/hour.

A voltage (upper voltage) applied by the upper power source 18 to the spinning nozzle 16 was set to 25 kV, a voltage (lower voltage) applied by the lower power source 22 to the collector 17 was set to 0 kV, and the solution was spun for 8 minutes. Thus, the first layer 2 was formed on the base material 1 (first step). Subsequent to the first step, the spinning was performed for 30 seconds while the upper voltage and the lower voltage were continuously changed to the voltages of the second step without the turning-off of the upper power source 18 and the lower power source 22. Thus, the buffer region 3 was formed (buffer region-forming step). Specifically, the buffer region 3 was formed by continuously changing the upper voltage from 25 kV to 15 kV over 30 seconds while keeping the lower voltage at 0 kV during the time period. Subsequent to the buffer region-forming step, the spinning was performed for 8 minutes at the same voltages as those described above (the upper voltage was 15 kV and the lower voltage was 0 kV) without the turning-off of the upper power source 18 and the lower power source 22. Thus, the second layer 4 was formed (second step). Thus, a polymer nanofiber structural body-containing member having the polymer nanofiber structural body 5 on the base material 1 was formed.

It was confirmed from the SEM observation of a fracture surface of the member that there was no interface and polymer nanofibers were integrated while their integration state continuously changed.

The thickness of the polymer nanofiber structural body 5 was 80 μm. In addition, its average fiber diameter, average pore diameter, and polymer nanofiber existence ratio near the first surface were 700 nm, 1.8 μm, and 34%, respectively, and its average fiber diameter, average pore diameter, and polymer nanofiber existence ratio near the second surface were 800 nm, 2.4 μm, and 27%, respectively.

Figure 3:
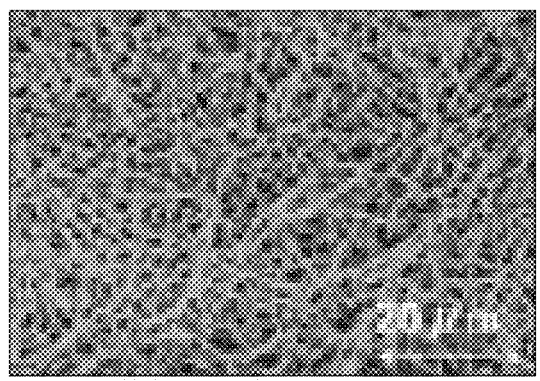
FIG. 3 shows a SEM image of a fracture surface of a polymer nanofiber structural body of Example 1 after a peeling resistance test.

Further, in the peeling resistance test of the member, no peeling was confirmed and its peeling resistance was determined as being good. FIG. 3 shows a SEM image of the fracture surface after the performance of the peeling resistance test.

Examples 2 and 3

Polymer nanofiber structural bodies were each produced in the same manner as in Example 1 except that the production conditions were changed as shown in TABLE 1. TABLE 1 shows the results of the evaluations.

Examples 4 and 5

Preparation of Polymer Solution

Two Milliliters of a polyethylene oxide (PEO) diluted solution was prepared by adjusting the concentration of PEO (manufactured by Sigma-Aldrich Corporation) to 6 wt % with pure water.

(Production of Polymer Nanofiber Structural Bodies)

Polymer nanofiber structural bodies were each produced in the same manner as in Example 1 except that the diluted solution was used and the production conditions were changed as shown in TABLE 1. TABLE 1 shows the results of the evaluations.

Example 6

Preparation of Polymer Solution

One Milliliter of a polystyrene (PS) diluted solution was prepared by adjusting the concentration of PS (molecular weight: 280,000, manufactured by Sigma-Aldrich Corporation) to 30 wt % with DMF.

(Production of Polymer Nanofiber Structural Bodies)

A polymer nanofiber structural body was produced in the same manner as in Example 1 except that the diluted solution was used and the production conditions were changed as shown in TABLE 1. TABLE 1 shows the results of the evaluations.

Example 7

Preparation of Polymer Solution

Used was a solution prepared by dissolving a polyvinylidene fluoride (PVDF) in 2-butanone so that a solid content concentration became 25 wt %.

(Production of Polymer Nanofiber Structural Body)

A polymer nanofiber structural body was produced in the same manner as in Example 1 except that the solution was used and the production conditions were changed as shown in TABLE 1. TABLE 1 shows the results of the evaluations.

Example 8

Preparation of Polymer Solution

A solution was prepared by dissolving polymethyl methacrylate (PMMA) in chloroform so that a solid content concentration became 10 wt %.

(Production of Polymer Nanofiber Structural Body)

A polymer nanofiber structural body was produced in the same manner as in Example 1 except that the solution was used and the production conditions were changed as shown in TABLE 1. TABLE 1 shows the results of the evaluations.

Comparative Examples 1, 2, and 4 to 6

Polymer nanofiber structural bodies were produced in the same manner as in Examples 1, 2, and 6 to 8, respectively except that the buffer region-forming step was not performed. Specifically, after the first step, both the upper power source 18 and the lower power source 22 were turned off once to establish a ground connection state. After that, the upper power source 18 and the lower power source 22 were restarted, and the second step was performed. TABLE 1 shows the results of the evaluations.

Comparative Example 3

A polymer nanofiber structural body A was produced under the same conditions as those of the first step of Example 4. After that, both the upper power source 18 and the lower power source 22 were turned off, and the polymer nanofiber structural body A was removed. In addition, a polymer nanofiber structural body B was produced under the same conditions as those of the second step of Example 4, both the upper power source 18 and the lower power source 22 were turned off, and the polymer nanofiber structural body B was removed. The polymer nanofiber structural bodies A and B were removed from the base material 1, and both the structural bodies were bonded to each other by: laminating both the structural bodies; applying pressures from both surfaces of the laminate so that its thickness became 90% of the original one; and holding the laminate in the state at 80° C. for 5 minutes. TABLE 1 shows the results of the evaluations.

TABLE 1

| | | | First step | | | Buffer region-forming step | Second step | | | Buffer region-forming step | Third step | | |
|---|---|---|---|---|---|---|---|---|---|---|---|---|---|
| | | Fiber Material | Upper voltage [KV] | Lower voltage [KV] | Spinning time [minutes] | Spinning time [seconds] | Upper voltage [KV] | Lower voltage [KV] | Spinning time [minutes] | Spinning time [seconds] | Upper voltage [KV] | Lower voltage [KV] | Spinning time [minute(s)] |
| Example | 1 | PAI | 25 | 0 | 8 | 30 | 15 | 0 | 8 | — | — | — | — |
| | 2 | PAI | 25 | 0 | 8 | 30 | 20 | −5 | 8 | — | — | — | — |
| | 3 | PAI | 20 | −5 | 5 | 30 | 15 | −10 | 5 | 30 | 25 | 0 | 5 |
| | 4 | PEO | 17 | −3 | 30 | 60 | 20 | 0 | 30 | — | — | — | — |
| | 5 | PEO | 20 | 0 | 30 | 60 | 20 | 3 | 30 | — | — | — | — |
| | 6 | PS | 20 | 0 | 5 | 360 | 15 | −5 | 10 | — | — | — | — |
| | 7 | PVDF | 18 | −2 | 10 | 30 | 15 | −10 | 5 | — | — | — | — |
| | 8 | PMMA | 16 | −8 | 5 | 300 | 24 | 0 | 10 | — | — | — | — |
| Comparative Example | 1 | PAI | 25 | 0 | 8 | — | 15 | 0 | 8 | — | — | — | — |
| | 2 | PAI | 25 | 0 | 8 | — | 20 | −5 | 8 | — | — | — | — |
| | 3 | PEO | 17 | −3 | 30 | — | 20 | 0 | 30 | — | — | — | — |
| | 4 | PS | 20 | 0 | 5 | — | 15 | −5 | 10 | — | — | — | — |

TABLE 1-continued

| | | | | | | | | | | | |
|---|---|---|---|---|---|---|---|---|---|---|---|
| 5 | PVDF | 18 | −2 | 10 | — | 15 | −10 | 5 | — | — | — | — |
| 6 | PMMA | 16 | −8 | 5 | — | 24 | 0 | 10 | — | — | — | — |

| | | Structural body thickness [μm] | Prescence of interface | Result of evaluation | | | | | | |
|---|---|---|---|---|---|---|---|---|---|---|
| | | | | Near first surface | | | Near second surface | | | Peeling resistance test |
| | | | | Average fiber diameter [nm] | Average pore diameter [μm] | Existance ratio [%] | Average fiber diameter [nm] | Average pore diameter [μm] | Existance ratio [%] | |
| Example | 1 | 80 | Absent | 700 | 1.8 | 34 | 800 | 2.4 | 27 | Good |
| | 2 | 80 | Absent | 700 | 1.8 | 34 | 700 | 1.1 | 57 | Good |
| | 3 | 80 | Absent | 700 | 1.1 | 57 | 700 | 1.8 | 34 | Good |
| | 4 | 300 | Absent | 750 | 1.0 | 48 | 750 | 1.6 | 36 | Good |
| | 5 | 300 | Absent | 750 | 1.6 | 36 | 900 | 1.5 | 28 | Good |
| | 6 | 120 | Absent | 900 | 2.2 | 30 | 900 | 1.6 | 45 | Good |
| | 7 | 80 | Absent | 850 | 1.4 | 50 | 800 | 1.0 | 62 | Good |
| | 8 | 70 | Absent | 600 | 0.8 | 66 | 600 | 1.3 | 40 | Good |
| Comparative Example | 1 | 75 | Present | 700 | 1.8 | 34 | 800 | 2.4 | 27 | Bad |
| | 2 | 75 | Present | 700 | 1.8 | 34 | 700 | 1.1 | 57 | Bad |
| | 3 | 280 | Present | 750 | 1.0 | 48 | 750 | 1.6 | 36 | Bad |
| | 4 | 80 | Present | 900 | 2.2 | 30 | 900 | 1.6 | 45 | Bad |
| | 5 | 70 | Present | 850 | 1.4 | 50 | 800 | 1.0 | 62 | Bad |
| | 6 | 60 | Present | 600 | 0.8 | 66 | 600 | 1.3 | 40 | Bad |

As described above by way of the embodiment and Examples, the polymer nanofiber structural body of the present invention can be a polymer nanofiber structural body having a high specific surface area that has a plurality of layers different from each other in pore structure and can be used over a long time period even when an external factor such as bending or rubbing is applied. Accordingly, the structural body can be suitably utilized as, for example, a material for collecting a substance.

As described above by way of the embodiment and Examples, according to the present invention, there can be provided a polymer nanofiber structural body which has a plurality of layers different from each other in pore structure, and part of which is not peeled by an operation that applies a stress such as bending.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-062927, filed Mar. 26, 2014, which is hereby incorporated by reference herein in its entirety.

What is claimed is:

1. A polymer nanofiber structural body comprising polymer nanofibers, the polymer nanofiber structural body further comprising:
   a first region;
   a second region; and
   a buffer region disposed between the first region and the second region,
   wherein a polymer nanofiber existence ratio of the first region is different from that of the second region,
   wherein the buffer region comprises a region in direct contact with the first region and the second region,
   wherein a polymer nanofiber existence ratio of the buffer region continuously changes from the polymer nanofiber existence ratio of the first region to the polymer nanofiber existence ratio of the second region in a direction from the first region to the second region,
   wherein each of the polymer nanofibers has a repeating unit comprising an imide structure,
   wherein the polymer nanofiber structural body is free of interfaces between the first region and the buffer region, and between the buffer region and the second region, and
   wherein the polymer nanofiber structural body is manufactured by a process comprising the steps of:
   (i) forming the first region by electrospinning under a first production condition;
   (ii) forming the second region by electrospinning under a second production condition that is different from the first production condition;
   (iii) between the step (i) and the step (ii), forming the buffer region by electrospinning while continuously changing a production condition from the first production condition to the second production condition,
   wherein the electrospinning in the step (iii) is conducted after the electrospinning in the step (i) continuously, and the electrospinning in the step (ii) is conducted after the electrospinning in the step (iii) continuously,
   wherein at least one of the steps (i), (ii), and (iii) includes an electrospinning step comprising a step of laminating a polymer nanofiber by ejecting a polymer solution containing a polymer as a raw material of the polymer nanofiber from a spinning nozzle to a collector or a base material placed on the collector, and
   wherein a positive voltage is applied to the spinning nozzle with a power source connected to the spinning nozzle, and a negative voltage is applied to the collector with a power source connected to the collector.

2. A polymer nanofiber structural body-containing member, comprising the polymer nanofiber structural body according to claim 1 on a base material.

3. A polymer nanofiber structural body comprising polymer nanofibers, the polymer nanofiber structural body further comprising:

a first region;

a second region; and a buffer region disposed between the first region and the second region, wherein an average pore diameter of the first region is different from that of the second region, wherein the buffer region comprises a region in direct contact with the first region and the second region, wherein an average pore diameter of the buffer region continuously changes from the average pore diameter of the first region to the average pore diameter of the second region in a direction from the first region to the second region, wherein each of the nanofibers has a repeating unit comprising an imide structure, wherein the polymer nanofiber structural body is free of interfaces between the first region and the buffer region, and between the buffer region and the second region, and wherein the polymer nanofiber structural body is manufactured by a process comprising the steps of:
  (i) forming the first region by electrospinning under a first production condition;
  (ii) forming the second region by electrospinning under a second production condition that is different from the first production condition;
  (iii) between the step (i) and the step (ii), forming the buffer region by electrospinning while continuously changing a production condition from the first production condition to the second production condition,
  wherein the electrospinning in the step (iii) is conducted after the electrospinning in the step (i) continuously, and the electrospinning in the step (ii) is conducted after the electrospinning in the step (iii) continuously,
  wherein at least one of the steps (i), (ii), and (iii) includes an electrospinning step comprising a step of laminating a polymer nanofiber by ejecting a polymer solution containing a polymer as a raw material of the polymer nanofiber from a spinning nozzle to a collector or a base material placed on the collector, and
  wherein a positive voltage is applied to the spinning nozzle with a power source connected to the spinning nozzle, and a negative voltage is applied to the collector with a power source connected to the collector.

4. A polymer nanofiber structural body-containing member, comprising the polymer nanofiber structural body according to claim 3 on a base material.

5. The polymer nanofiber structural body according to claim 1, wherein a material of the first region and a material of the second region comprise a same repeating unit.

6. The polymer nanofiber structural body according to claim 3, wherein a material of the first region and a material of the second region comprise a same repeating unit.

7. A manufacturing method of a polymer nanofiber structural body, the polymer nanofiber structural body comprising a first region, a second region, and a buffer region between the first region and the second region, wherein a polymer nanofiber existence ratio of the first region is different from that of the second region, wherein the buffer region comprises a region that is in direct contact with the first region and the second region, wherein a polymer nanofiber existence ratio of the buffer region continuously changes from the polymer nanofiber existence ratio of the first region to the polymer nanofiber existence ratio of the second region in a direction from the first region to the second region, wherein each polymer nanofiber in the polymer nanofiber structural body has a repeating unit comprising an imide structure, and wherein the polymer nanofiber structural body is free of interfaces between the first region and the buffer region, and between the buffer region and the second region, the manufacturing method comprising the steps of:

(i) forming the first region by electrospinning under a first production condition;

(ii) forming the second region by electrospinning under a second production condition that is different from the first production condition;

(iii) between the step (i) and the step (ii), forming the buffer region by electrospinning while continuously changing a production condition from the first production condition to the second production condition, wherein the electrospinning in the step (iii) is conducted after the electrospinning in the step (i) continuously, and the electrospinning in the step (ii) is conducted after the electrospinning in the step (iii) continuously, wherein at least one of the steps (i), (ii), and (iii) includes an electrospinning step comprising a step of laminating a polymer nanofiber by ejecting a polymer solution containing a polymer as a raw material of the polymer nanofiber from a spinning nozzle to a collector or a base material placed on the collector, and wherein a positive voltage is applied to the spinning nozzle with a power source connected to the spinning nozzle, and a negative voltage is applied to the collector with a power source connected to the collector.

\* \* \* \* \*